ISAAC JAY, OF PENDLETON, OREGON.

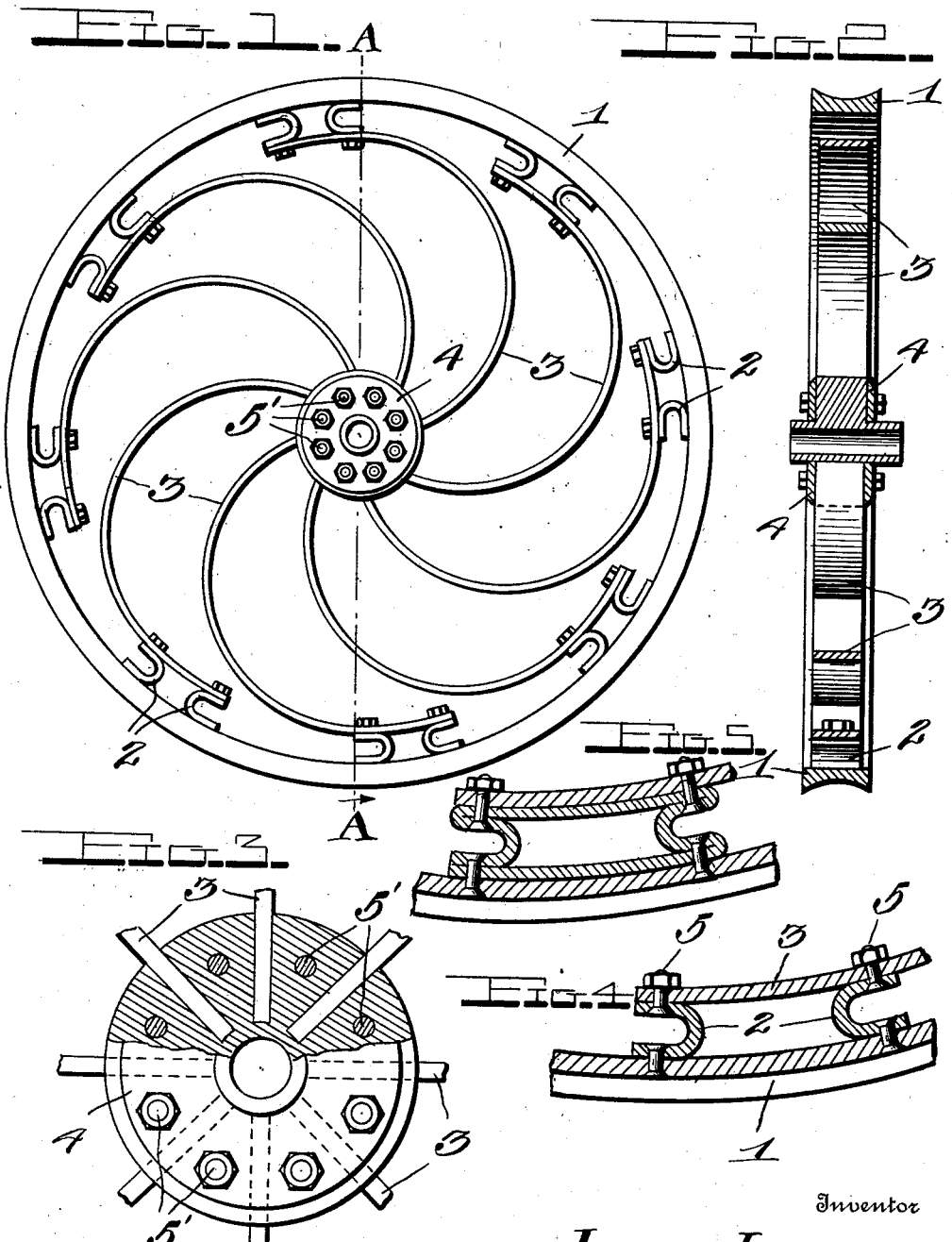

RESILIENT WHEEL.

1,009,314.

Specification of Letters Patent.  Patented Nov. 21, 1911.

Application filed April 12, 1911. Serial No. 620,581.

*To all whom it may concern:*

Be it known that I, ISAAC JAY, a citizen of the United States, residing at Pendleton, in the county of Umatilla and State of Oregon, have invented certain new and useful Improvements in Resilient Wheels, of which the following is a specification, reference being had to the accompanying drawings.

This invention relates to resilient or spring wheels and has for its object to provide in such a wheel spokes which can be readily and quickly attached or removed and which shall be of such shape and form as to be suitable in a wheel for heavy transportation purposes.

With this and other objects in view, the invention consists of the novel features of construction, combination and arrangement of parts hereinafter fully described and claimed, and illustrated in the accompanying drawings, in which—

Figure 1 is a side view of a wheel embodying my invention; Fig. 2 is a view in section along the line A—A of Fig. 1; Fig. 3 is a detail of the hub of the wheel shown in Fig. 1; and Fig. 4 is a detail of the attachments for securing the spokes to the rim. Fig. 5 is a modification of a form of an attachment for securing the spokes to the rim.

Similar reference characters refer to similar parts throughout the drawings.

In the drawings 1 represents the rim of a wheel to which are secured by means of rivets or screws the U-shaped pieces 2 of resilient material. A pair of these pieces 2 are spaced apart or close to one another and serve to hold a resilient spoke 3 near the end as clearly shown in Fig. 1. It is preferable that these U-shaped pieces should be placed back to back in each pair. The other end of the spoke 3 is clamped between the plates 4 of the hub of the wheel by means of bolts and nuts as shown in detail in Fig. 3. The end of the spokes that are attached to the U-shaped pieces are preferably secured thereto by bolts 5 countersunk on one side and extending through the pieces to receive a nut which should be located so as to be readily removed or tightened.

The modification shown in Fig. 5 is particularly desirable where a stronger acting resilient means is desired for connecting the spokes to the rim of the wheel, in the manner already described. By having each of these connecting pieces made of one piece of material, it is possible to have the distance between the bolts uniformly disposed for each spoke, which is a valuable feature in constructing the wheels, at the same time there is less liability of this piece being lost when in use, as both bolts will have to be disconnected before this can happen. This modification also reduces greatly the liability of the connecting piece snapping or breaking, and in some cases is cheaper to manufacture than that of the other modification.

Should it be desirable to remove one of the spokes of the wheel a pair of the bolts 5' on the hub and either side of the hub end of the spoke which project therein to the axle, are loosened or removed, to permit this end to come out of the hub; then by loosening the bolts 5, attaching the other end to the U-shaped pieces of the rim of the wheel the whole spoke can be easily removed and if desired another inserted by reversing the operation.

The advantage of having the U-shaped pieces back to back as shown is that it gives a more elastic action to the wheel and permits the bolts 5 to be readily gotten out.

While I have shown a pair of these U-shaped pieces secured to the rim end of the spoke I anticipate the use of more or less than this number and of different sizes if desired, and I do not wish to limit myself in any way except that necessitated by the prior art as many modifications of my construction may be made without departing from the principles thereof.

Having thus described the invention what is claimed is:

1. A resilient wheel comprising in combination a rim, a plurality of pairs of U-shaped pieces disposed back to back on the interior of said rim, a plurality of resilient spokes having their end portions connected to a pair of said U-shaped pieces, and a hub for holding the inner portions of said spokes.

2. A resilient wheel comprising in combination a rim, a plurality of curved spokes, a hub having plates and bolts for securing the inner ends of said spokes, a plurality of U-shaped pieces adapted to be disposed back to back on the rim of said wheel and the outer ends of said spokes, and means for attaching said spokes to said rim and to said pieces.

3. A resilient wheel comprising in combination a rim, a plurality of curved spokes, a hub having plates and bolts for securing the inner ends of said spokes, a plurality of U-shaped pieces adapted to be disposed, back to back, on the rim of said wheel and the outer ends of said spokes, means for integrally connecting each pair of U-shaped pieces, means for attaching said spokes to said rim and to said pieces.

In testimony whereof I hereunto affix my signature in the presence of two witnesses.

ISAAC JAY.

Witnesses:
    LLOYD D. IDLEMAN,
    GEO. W. COUTTS.

Copies of this patent may be obtained for five cents each, by addressing the "Commissioner of Patents, Washington, D. C."